United States Patent
Sbongk

(10) Patent No.: US 6,843,630 B2
(45) Date of Patent: Jan. 18, 2005

(54) FASTENING CLIP HAVING ANNULAR PORTION AND LEGS FORMED WITH LOCKING MEANS, AND STRUCTURE HAVING PANEL FASTENED BETWEEN OPPOSITE WALLS OF ACCOMMODATING MEMBER BY TWO SAID CLIPS

(75) Inventor: Albert Sbongk, Niederstetten (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 0 days.

(21) Appl. No.: 09/984,901

(22) Filed: Oct. 31, 2001

(65) Prior Publication Data

US 2002/0064435 A1 May 30, 2002

(30) Foreign Application Priority Data

Nov. 24, 2000 (DE) ......................................... 100 58 520

(51) Int. Cl.[7] ............................................... F16B 21/06
(52) U.S. Cl. .......................... 411/508; 411/338; 24/453
(58) Field of Search ................................ 411/338, 339, 411/508–510, 512; 24/247, 453; 403/408.1, 334, 340

(56) References Cited

U.S. PATENT DOCUMENTS

| | | | | |
|---|---|---|---|---|
| 2,201,551 A | * | 5/1940 | Welk | |
| 3,437,003 A | * | 4/1969 | Rhoads | |
| 3,448,652 A | * | 6/1969 | Rhoads | |
| 4,604,014 A | * | 8/1986 | Frano | |
| 4,648,738 A | * | 3/1987 | Thielen | |
| 4,834,569 A | * | 5/1989 | Foote | |
| 4,956,900 A | * | 9/1990 | Mair | |
| 6,009,562 A | * | 1/2000 | Bullock | |
| 6,123,492 A | * | 9/2000 | Pickard | |

* cited by examiner

Primary Examiner—Flemming Saether
(74) Attorney, Agent, or Firm—Lowe Hauptman Gilman & Berner, LLP

(57) ABSTRACT

A fastening clip has an annular portion and two legs extending therefrom, each leg having a locking element. Two identical clips can be fastened together with the locking elements securing against separation. The clips can be used to fasten a panel to opposite walls of an accommodating member by inserting the clips from opposite sides in aligned through bores formed in the panel and the opposite walls, and pushing the clips toward each other until the locking elements engage. The annular portions of the clips have shoulders engaging the panel, while the legs have resilient projections engaging a surface of the through bore of the panel. The legs of each clip are barb-shaped and have distal ends snuggly fitted in spaces formed in the annular portion between the legs of the other clip.

14 Claims, 2 Drawing Sheets

US 6,843,630 B2

FASTENING CLIP HAVING ANNULAR PORTION AND LEGS FORMED WITH LOCKING MEANS, AND STRUCTURE HAVING PANEL FASTENED BETWEEN OPPOSITE WALLS OF ACCOMMODATING MEMBER BY TWO SAID CLIPS

FIELD OF THE INVENTION

This invention relates to a fastening means for fastening a panel-shaped structural member in an accommodation member.

BACKGROUND OF THE INVENTION

In automobiles, for example, there is a need to position and mount panels, e.g. side glass panes of the automobile, in an existing accommodation member. For this purpose, it is known to use a hollow double pin which is forced into the bore of the panel. Because there are vibrations, tolerances and the like the pin might happen to be displaced in an axial direction in the bore and will drop out, in a most unfavourable case.

SUMMARY OF THE INVENTION

It is the object of the invention to provide a fastening means for fastening a panel-shaped structural member in an accommodation member which can be easily mounted and is secured from loss.

In the inventive fastening means, the diameter of the bore in the panel-shaped structural member is smaller than that of the through bores in the wall of the accommodation member. According to the invention, two identical clips made of a plastic material are now provided which are adapted to be inserted at opposed ends of the bores. Each clip has an approximately annular cylindrical portion and a hollow shank. The annular cylindrical portion is positioned in a through bore of a wall whereas the shank extends through the bore of the panel-shaped structural member and the through bore of the other wall. The annular cylindrical portion has an approximately radial, approximately annularly circumferential shoulder which bears against the associated edge of the panel-shaped structural member. The shank has at least two circumferentially spaced legs with the interstice between adjacent legs accommodating a leg of the other clip. The legs at the outer side have a radially projecting portion which is adapted to engage the hole wall of the bore. Finally, the legs have locking means which coact when the legs are interlacingly nested and secure the clips against any movement away from each other.

The radially projecting portion of the legs serves to balance out the tolerance of the bore. Therefore, according to an aspect of the invention, it is opportune that the radial portion be resilient and, according to another aspect, be namely such that the portion having the projection is formed by two parallel spaced cuts in the leg.

The inventive fastening means is assembled by simply inserting the clips into the bores from opposed sides and locking the shafts. The assembling forces may be very low. It is unnecessary to adjust the components with respect to each other in an axial direction. The shoulders of the clips bear on the panel under more or less tension, thus positioning it in the accommodation member with no need to provide an abutting contact with regard to the wall of the accommodating channel, but on the contrary, the panel may be spaced from the wall. When in the assembled position, the clips will completely disappear in the bores and, thus, will not project therefrom.

An easy, non-destructive disassembly is possible by means of a simple tool. If disassembly is done expertly the clips may also be used again. Faulty assembly may be ruled out by giving them a particular shape. The inventive clips may be readily formed by the injection molding process without causing great expenditure.

The shanks of the inventive clips are positively interengaged in a circumferential direction. This makes it impossible to rotate them relative to each other.

According to a further aspect of the invention, the legs are provided to be formed to segments of the cylindrical portion that have a larger thickness than the adjacent portions of the annular cylindrical portion and the legs have a circular arc shaped outer contour in the end portion and an outer diameter such that the legs can be nearly fittingly plugged into the annular cylindrical portion of the respective opposed clip in the space between adjacent segments. Therefore, the legs may be moved towards each other at best, but not away from each other, which can ensure an efficient locking effect.

Various possible ways are imaginable to efficiently lock the legs. To this effect, an aspect of the invention provides that flexible arms be formed to the end facing away from the annular cylindrical portion, which arms are barb-shaped and extend back towards the annular cylindrical portion at an acute angle with respect to the legs and corner portions at the free ends of the arms engage each other when the clips are completely plugged into each other, whereby the clips are secured against any movement way from each other. One corner portion each interacts with a corner portion of the adjacent arm of the other clip. If two arms each are provided on a clip, which are diametrically opposed to each other, the arms of the other clip naturally extend so as to be offset at an angle of 90° therefrom. Disassembly can be performed by bending the arms away from each other. The clips can be pulled out of the bores subsequently.

BRIEF DESCRIPTION OF THE DRAWINGS

Now, the invention will be explained in greater detail with reference to an embodiment shown in the drawings.

DETAILED DESCRIPTION OF THE DRAWINGS

Figure 1:
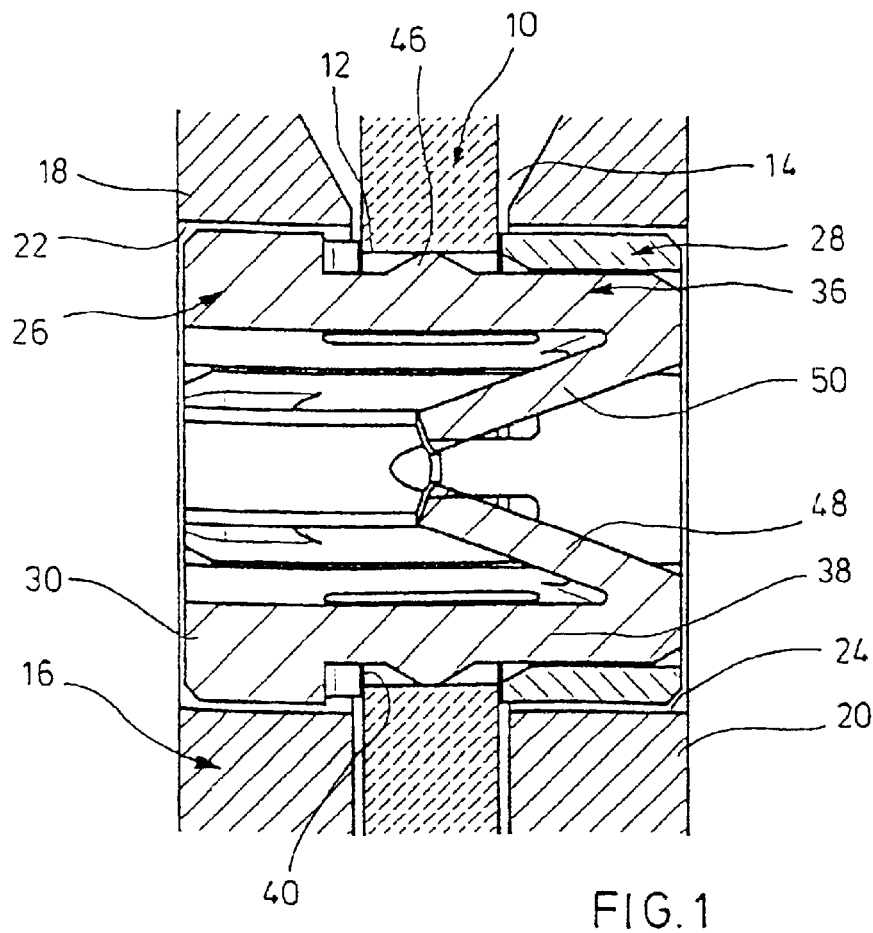
FIG. 1 shows a section through an assembling situation of a fastening means according to the invention.
Figure 2:
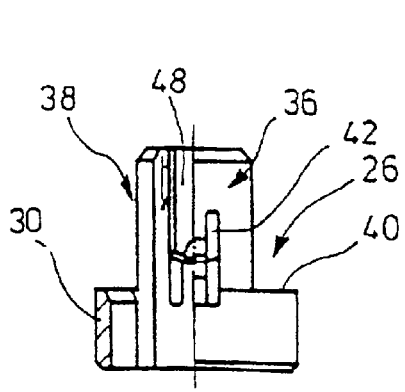
FIG. 2 shows a clip of the fastening means of FIG. 1, partly in a side view, partly in a section.
Figure 3:
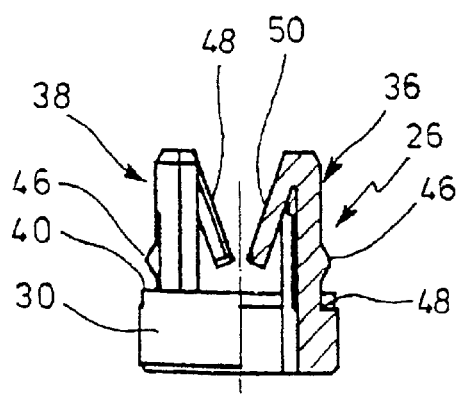
FIG. 3 shows a view similar to that of FIG. 2, but in a position offset by 90°.
Figure 4:
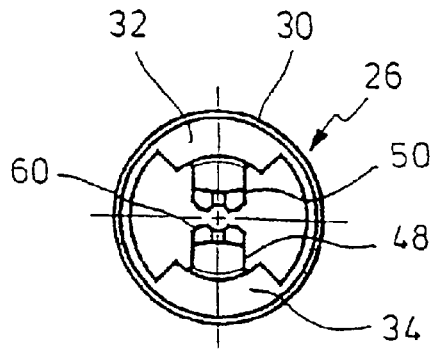
FIG. 4 shows a plan view of the clip of FIG. 2 or FIG. 3 from the bottom end.
Figure 5:
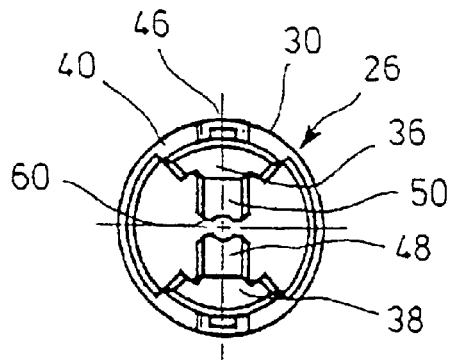
FIG. 5 shows a plan view of the clip of FIG. 2 or FIG. 3 from the top end.
Figure 6:
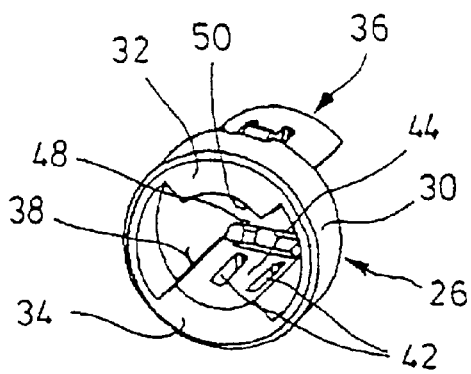
FIG. 6 shows a perspective view of the fastening means of FIG. 1.
Figure 7:
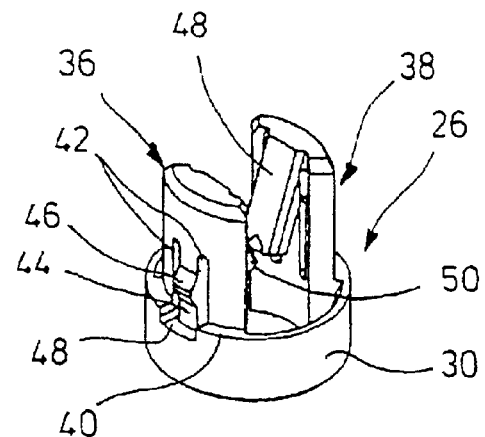
FIG. 7 shows the clip of FIG. 6 in another position.

Referring to FIG. 1, a panel 10 can be seen which has a bore 12. The panel 10 is disposed in an accommodating channel 14 of an accommodation member 16 which is not shown in detail with the channel 14 being defined by wall portions 18, 20. Wall portions 18, 20 have a through bore 22 and 24, respectively. The through bores 22, 24 and the bore 12 are aligned with respect to each other with the latter having a diameter slightly smaller than that of bores 22, 24.

The bores described have inserted therein a fastening means which comprises two identical clips 26, 28. The clips 26, 28 will be described with reference to the Figures which follow.

Clip 26 is shown in FIGS. 2 to 7. It has an annular cylindrical portion 30 with an outer diameter which allows it to be inserted into a through bore 22, 24 shown in FIG. 1. As is apparent from FIGS. 4 and 6 the annular cylindrical portion 30 has two diametrically opposed segments 32, 34 which are slightly thicker. Legs 36, 38 which define a shank together are formed to the segments 32, 34. Legs 36, 38 are located opposite the annular cylindrical portion 30 and are radially offset inwardly so that an approximately circumferential radial, annular shoulder 40 is formed on the side of legs 36, 38 on the annular cylindrical portion 30. The outer contour of legs 36, 38 is circular arc shaped with the outer diameter being approximately equal to the inner diameter of the portions of the annular cylindrical portion 30 between segments 32, 34. The circumferential extension of legs 36, 38 is such that the interstices remaining vacant between those (see FIG. 6 or FIGS. 4 and 5) approximately correspond to the cross-section of legs 36, 38. In the present embodiment, therefore, the circumferential extension of the legs is approximately 90°.

Each leg 36, 38 has parallel-spaced, axially parallel slots 42, by which a web 44 is formed that has a radial projection 46. The annular cylindrical portion 30 is provided with a recess 48 in the area of the web 44.

Figure 8:
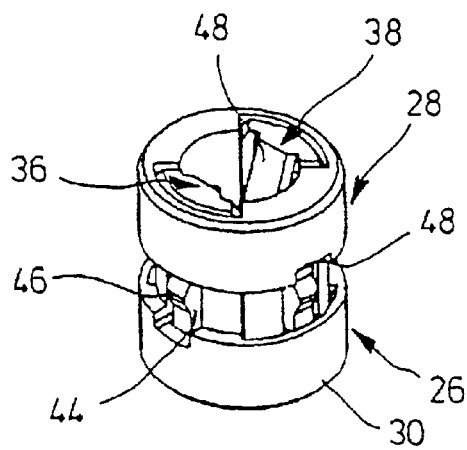
FIG. 8 shows the assembly of two clips of FIGS. 6 and 7 in a perspective representation.
Figure 9:
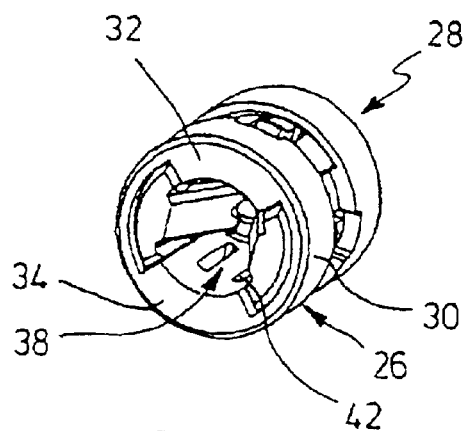
FIG. 9 shows the representation of FIG. 8 in another position of assembly.

Arms 48, 50 are formed to the ends of legs 36, 38. The width of arms 48, 50 is smaller than that of legs 36, 38. Arms 48, 50 are barb-shaped and extend towards the annular cylindrical portion 30 at an acute angle with respect to the legs 36, 38. Clips 26, 28 are of identical shapes. Furthermore, they are designed in such a way that two clips can be interplugged from opposite sides as is shown in FIGS. 8 and 9. The legs 36, 38 of the two clips 26, 28 are positively interengaged as is apparent from FIGS. 8 and 9. Arms 48, 50 are dimensioned so and are formed at the ends in such a way that corner portions of arms 48, 50 come to lie towards each other with associated corner portions of the arms offset by 90° of the other clip. To this end, arms 48, 50 are somewhat chamfered in the corner portions as is outlined at 60 in FIGS. 4 and 5. In this way, clips 26, 28 are secured against a movement away from each other.

For assembly, two clips 26, 28 of the identical type described are plugged into the aligned bores 22, 24, and 12 from opposed sides in a position turned towards each other by 90° as is shown in FIG. 1. This causes the shoulders 40 to bear against the associated side faces of panel 10. The projection 46, which exists twice per clip, thereby will abut against the wall of bore 12 of panel 10. Possible tolerances of bore 12 may be balanced out by the fact that webs 44 with projections 46 will radially yield. While clips 26, 28 are completely interplugged the corner portions of resilient arms 48, 50 will engage each other so that this secures the fastening means in a captive way. The whole fastening means is within the region of bores 22 and 24 (FIG. 1) and, hence does not annoyingly project outwardly. The outer contour of legs 36, 38 is seated in the annular portion of each other clip, which causes the legs to be secured by each other clip both outwardly and laterally. Deformation is possible at best in a radially inward direction, which increasingly brings arms 48, 50 in a locking engagement, however.

Clips 26, 28 each are integrally formed from a suitable plastic material.

What is claimed is:

1. In combination,
    an accommodating member having spaced opposite walls each having a through bore;
    a structural member sandwiched between the walls of said accommodating member, and having a through bore aligned with the through bores in the walls of said accommodating member; and
    a pair of fastening clips each including an annular portion, and at least one leg extending therefrom, said leg having a locking element extending in a radial direction that is accessible from outside through the annular portion so as to be flexible in said radial direction;
    wherein
    said clips are received in the aligned through bores so that the annular portion of each clip is positioned in the through bore of the respective wall of said accommodating member, and the legs of said clips extend into the through bore of the structural member so as to interlace with each other with the locking elements securing against separation;
    each clip comprises two said legs; and
    each locking element of each clip is positively and directly engaged with both locking elements of the other clip at portions that are accessible from outside through the annular portion or portions of at least one of said clips.

2. The combination of claim 1, wherein
    the annular portion of each clip has two thicker segments and two thinner segments arranged in alternating fashion in a circumferential direction of said annular portion, said two thicker segments having a radial dimension greater than that of said two thinner segments;
    each of the legs has a close end connected to one of the thicker segments and a distal end, the thinner segments corresponding to spaces between the thicker segments; and
    the distal ends of the legs of each clip are received in the spaces between the thicker segments of the annular portion of the other clip.

3. The combination of claim 1, wherein each leg of each clip is barb-shaped and comprises
    an upright portion having a close end connected to the respective annular portion and a distal end; and
    a flexible arm extending from the distal end of the upright portion toward the respective annular portion at an acute angle with respect to the upright portion to define the locking element, said arm having a first end connected to the distal end of the upright portion and a second end closer to the respective annular portion than the first end.

4. The combination of claim 3, wherein the second ends of the arms of the legs of one of said clips are positively and directly engaged with the second ends of the arms of both legs of the other clip.

5. The combination of claim 4, wherein the second end of each arm has chamfered corners, said arms are directly engaged at said chamfered corners.

6. A fastening device, comprising a pair of fastening clips, each of said clips comprising:
    an annular portion having opposite first and second surfaces and a through hole connecting the surfaces; and two legs circumferentially spaced to define a hollow shank, each of said legs extending from the first surface in an axial direction of said through hole away from the second surface and having a locking element extending in a radial direction that is accessible from the side of the second surface via the through hole so as to be flexible in said radial direction, said locking element being adapted to engage the locking element of the other clip to secure against separation when said clips are locked together in a locked state;

wherein, when said clips are locked in said locked state, each leg of each clip is positively and directly engaged with both legs of the other clip at portions that are accessible from outside through the annular portion or portions of at least one of said clips.

7. The fastening device of claim 6, wherein an entirety of each of said clips is made integrally into a single body made of a plastic material.

8. The fastening device of claim 6, wherein said clips are identical.

9. The fastening device of claim 6, wherein each of said legs has a resilient portion projecting radially outwardly with respect to said through hole.

10. The fastening device of claim 6, wherein an outer circumferential surface of each of said legs is offset radially inwardly with respect to an outer circumferential surface of the respective annular portion so that a shoulder is formed.

11. A fastening device, comprising a pair of fastening clips, each of said clips comprising:

an annular portion having opposite first and second surfaces and a through hole connecting the surfaces; and two legs circumferentially spaced to define a hollow shank, each of said legs extending from the first surface in an axial direction of said through hole away from the second surface and having a locking element extending in a radial direction that is accessible from the side of the second surface via the through hole so as to be flexible in said radial direction, said locking element being adapted to engage the locking element of the other clip to secure against separation when said clips are locked together in a locked state;

wherein, when said clips are locked in said locked state, each leg of each clip is positively and directly engaged with both legs of the other clip at portions that are accessible from outside through the annular portion or portions of at least one of said clips;

wherein each of said legs is barb-shaped and comprises:

an upright portion having a close end connected to the first surface of the annular portion and a distal end; and a flexible arm extending from the distal end of the upright portion toward the annular portion at an acute angle with respect to the upright portion to define the locking element, said arm having a first end connected to the distal end of the upright portion and a second end closer to the annular portion than the first end; and wherein, for each of said clip, a distance between the second ends is smaller than a distance between the first ends so that said arms of said clip get closer as the arms extend toward the annular portion.

12. The fastening device of claim 11, wherein, for each of said clips, the annular portion has two thicker segments and two thinner segments arranged in alternating fashion in a circumferential direction of said annular portion, said two thicker segments having a radial dimension greater than that of said two thinner segments, the thinner segments corresponding to spaces between the thicker segments; and the distal ends of the upright portions of the legs of said clip are receivable in the spaces between the thicker segments of the annular portion of the other clip.

13. In combination, an accommodating member having spaced opposite walls each having a through bore;

a structural member sandwiched between the walls of said accommodating member, and having a through bore aligned with the through bores in the walls of said accommodating member; and a pair of fastening clips each including an annular portion, and at least one leg extending therefrom, said leg having a locking element that is accessible from outside through the annular portion;

wherein said clips are received in the aligned through bores so that the annular portion of each clip is positioned in the through bore of the respective wall of said accommodating member, and the legs of said clips extend into the through bore of the structural member so as to interlace with each other with the locking elements securing against separation;

each clip comprises two said legs;

each leg of each clip is positively and directly engaged with both legs of the other clip at portions that are accessible from outside through the annular portion or portions of at least one of said clips; and each leg of each clip is barb-shaped and comprises:

an upright portion having a close end connected to the respective annular portion and a distal end; and a flexible arm extending from the distal end of the upright portion toward the respective annular portion at an acute angle with respect to the upright portion to define the locking element, said arm having a first end connected to the distal end of the upright portion and a second end closer to the respective annular portion than the first end;

wherein, for each of said clips, a distance between the second ends of the arms of the legs is smaller than a distance between the first ends so that said arms get closer as the arms extend toward the annular portion.

14. A fastening device, comprising a pair of fastening clips, each of said clips comprising:

an annular portion having opposite first and second surfaces and a through hole connecting the surfaces; and two legs circumferentially spaced to define a hollow shank, each of said legs extending from the first surface in an axial direction of said through hole away from the second surface and having a locking element that is accessible from the side of the second surface via the through hole, said locking element being adapted to engage the locking element of the other clip to secure against separation when said clips are locked together in a locked state;

wherein, when said clips are locked in said locked state, each leg of each clip is positively and directly engaged with both legs of the other clip at portions that are accessible from outside through the annular portion or portions of at least one of said clips;

wherein each of said legs is barb-shaped and comprises:

an upright portion having a close end connected to the first surface of the annular portion and a distal end; and a flexible arm extending from the distal end of the upright portion toward the annular portion at an acute angle with respect to the upright portion to define the locking element, said arm having a first end connected to the distal end of the upright portion and a second end closer to the annular portion than the first end;

wherein, for each of said clip, a distance between the second ends is smaller than a distance between the first ends so that said arms of said clip get closer as the arms extend toward the annular portion; and wherein, for each of said clips, the legs are located diametrically opposite on the annular portion, and the arm of each of the legs extends toward the other leg.

* * * * *